United States Patent
Gomer et al.

(10) Patent No.: US 12,523,873 B2
(45) Date of Patent: Jan. 13, 2026

(54) COMPOSITE PANE FOR A HOLOGRAPHIC HEAD-UP DISPLAY

(71) Applicant: SAINT-GOBAIN GLASS FRANCE, Courbevoie (FR)

(72) Inventors: Andreas Gomer, Kerpen (DE); Jan Hagen, Bonn (DE); Daniel Krekel, Aachen (DE); Stefan Altmeyer, Dormangen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 552 days.

(21) Appl. No.: 17/926,072

(22) PCT Filed: May 10, 2021

(86) PCT No.: PCT/EP2021/062289
§ 371 (c)(1),
(2) Date: Nov. 17, 2022

(87) PCT Pub. No.: WO2021/233713
PCT Pub. Date: Nov. 25, 2021

(65) Prior Publication Data
US 2023/0185088 A1  Jun. 15, 2023

(30) Foreign Application Priority Data
May 18, 2020 (EP) ..................... 20175125

(51) Int. Cl.
*G02B 27/01* (2006.01)
*B32B 7/023* (2019.01)
(Continued)

(52) U.S. Cl.
CPC .......... *G02B 27/0103* (2013.01); *B32B 7/023* (2019.01); *B32B 17/10036* (2013.01);
(Continued)

(58) Field of Classification Search
None
See application file for complete search history.

(56) References Cited

U.S. PATENT DOCUMENTS 4,457,579 A * 7/1984 Thylen ............... G02B 27/0103
  359/13
4,842,389 A * 6/1989 Wood ................ B32B 17/10036
  156/99

(Continued)

FOREIGN PATENT DOCUMENTS

CN      1411553 A    4/2003
CN    101712746 A    5/2010

(Continued)

OTHER PUBLICATIONS

International Search Report as issued in International Patent Application No. PCT/EP2021/062289, dated Jun. 11, 2021.

(Continued)

*Primary Examiner* — Derek S. Chapel
(74) *Attorney, Agent, or Firm* — Pillsbury Winthrop Shaw Pittman LLP

(57) ABSTRACT

A composite pane includes an outer pane having outer and inner surfaces, a first thermoplastic intermediate layer, a hologram element including a first set of holograms produced in one or more layers of a holographic material, wherein the first set of holograms includes a blue hologram that is activatable by blue light having a wavelength in a first range and is not responsive to light of other wavelengths, a green hologram that is activatable by green light having a wavelength in a second range and is not responsive to light of other wavelengths, and a red hologram that is activatable by red light having a wavelength in a third range and is not responsive to light of other wavelengths, an inner pane, and a color-selective optical filter for selective absorption of light.

20 Claims, 9 Drawing Sheets

Figure 1:
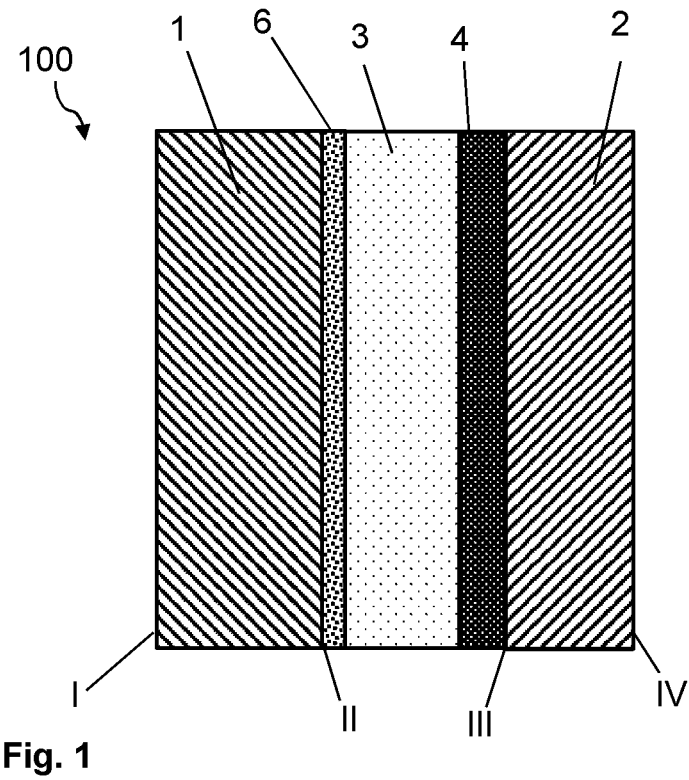

(51) Int. Cl.
*B32B 17/10* (2006.01)
*B32B 33/00* (2006.01)
*G02B 5/20* (2006.01)
*G02B 5/22* (2006.01)
*G02B 5/32* (2006.01)

(52) U.S. Cl.
CPC ........ *B32B 17/10449* (2013.01); *B32B 33/00* (2013.01); *G02B 5/203* (2013.01); *G02B 5/22* (2013.01); *G02B 5/32* (2013.01); *B32B 2307/4026* (2013.01); *B32B 2307/42* (2013.01); *B32B 2419/00* (2013.01); *B32B 2605/00* (2013.01); *G02B 2027/0105* (2013.01); *G02B 2027/0109* (2013.01); *G02B 2027/0112* (2013.01); *G02B 2027/0194* (2013.01); *G02B 2207/101* (2013.01); *G02B 2207/109* (2013.01)

(56) References Cited

U.S. PATENT DOCUMENTS

| | | | | |
|---|---|---|---|---|
| 5,210,624 | A | * | 5/1993 | Matsumoto ........ G02B 27/0103 359/24 |
| 5,859,714 | A | * | 1/1999 | Nakazawa ........ G02B 27/0103 359/24 |
| 2016/0003996 | A1 | * | 1/2016 | Dehmlow ............. G02B 23/14 359/566 |
| 2019/0056596 | A1 | | 2/2019 | Bailey et al. |

FOREIGN PATENT DOCUMENTS

| | | |
|---|---|---|
| CN | 103534632 A | 1/2014 |
| CN | 106716048 A | 5/2017 |
| CN | 109901297 A | 6/2019 |
| DE | 42 42 797 C2 | 9/1994 |
| DE | 10 2012 206576 A1 | 10/2013 |
| DE | 10 2012 211729 A1 | 1/2014 |
| DE | 10 2017 212451 A1 | 1/2019 |
| EP | 0 490 397 A2 | 6/1992 |
| EP | 0 420 228 B1 | 3/1995 |
| EP | 0 950 913 B1 | 12/2004 |
| EP | 3 412 723 A1 | 12/2018 |
| JP | H06-199149 A | 7/1994 |
| JP | H07-257226 A | 10/1995 |
| WO | WO-2011121949 A1 * | 10/2011 ............ B60K 35/23 |
| WO | WO 2012/156124 A1 | 11/2012 |
| WO | WO 2019/008374 A1 | 1/2019 |

OTHER PUBLICATIONS

First Office Action as issued in Chinese Patent Application No. 202180002361.8, dated Mar. 11, 2023.

* cited by examiner

COMPOSITE PANE FOR A HOLOGRAPHIC HEAD-UP DISPLAY

CROSS-REFERENCE TO RELATED APPLICATIONS

This application is the U.S. National Stage of PCT/EP2021/062289, filed May 10, 2021, which in turn claims priority to European patent application number 20 175 125.2 filed May 18, 2020. The content of these applications are incorporated herein by reference in their entireties.

The invention relates to a composite pane, in particular for a holographic head-up display, a method for producing such a composite pane, and the use of such a composite pane.

Composite panes are currently used in many places, in particular in the vehicle sector. Here, the term "vehicle" includes, among other things, road vehicles, aircraft, watercraft, agricultural machinery, or even work equipment.

Composite panes are also used in other sectors. These include, for example, architectural glazings or information displays, e.g., in museums or as advertising displays.

Often, composite panes are also used as a head-up display (HUD) for displaying information. In that case, an image is projected by means of a projection apparatus onto the composite glass panes to insert information into the field of vision of the viewer. In the vehicle sector, the projection apparatus is, for example, arranged on the dashboard such that the projected image is reflected on the nearest glass surface of the composite glass pane inclined in the direction of the viewer (cf., e.g., the European patent EP 0 420 228 B1 or the German published application DE 10 2012 211 729 A1).

Reflection holograms that are laminated between the panes of a composite pane can be used for head-up displays. The reflection hologram can contain information recorded therein. The hologram can be activated by means of light emitted from a projector and thus the information recorded in the hologram can be reproduced for the viewer.

Head-up displays comprising holographic optical elements are disclosed, for example, in the publications DE 10 2017 212 451 A1, WO 2012/156124 A1, and US 2019/0056596 A1.

The reflection hologram of a holographic head-up display is generally designed such that it responds to light in a narrow wavelength range that is emitted by an internally arranged projector. However, it is also subject to external light sources, such as sunlight or artificial lighting such as streetlights or headlights of oncoming vehicles. Thus, unintentional at least partial activation from the outside by the external light sources is possible. Such unintentional activation causes shimmering of the hologram and leads to unnecessary distractions and possibly to dazzling of the viewer and is consequently unacceptable for safety reasons.

EP 0 950 913 B1 discloses a device for improving the contrast of the display of a head-up display in a motor vehicle, wherein the windshield is darkly tinted at a specific spatial angle as viewed by the vehicle driver and wherein data displayed by means of a head-up display are visible to the driver at this specific spatial angle. The specific spatial angle at which the windshield is darkened is outside the driver's customary field of vision which he usually has to see when driving a motor vehicle.

The patent DE 42 42 797 C2 discloses a head-up display system for displaying vehicle information, having a reflective hologram plate with which the display light can be deflected to the vehicle driver, wherein the hologram plate is arranged in the lower region of the windshield of the vehicle and a dark film or a layer of black ceramic paint is provided on the back of the hologram plate to shield against penetration of outside light into the hologram plate. In order not to restrict the driver's field of vision, the hologram plate is mounted in the lower region of the windshield.

EP 0 490 397 A2 discloses a head-up display for a vehicle comprising a primary image hologram that is supported in the vehicle driver's field of vision of the surrounding scene in front of the vehicle and a protective hologram in front of the primary image hologram to diffract ambient illumination that could otherwise switch the first reflection hologram on in error, wherein the protective hologram has an angular bandwidth and a spectral bandwidth greater than the angular bandwidth and the spectral bandwidth of the primary image hologram.

The object of the present invention is to provide an improved composite pane for a holographic head-up display that is simple to manufacture and with which inadvertent activation of a hologram, i.e., inadvertent reproduction of information recorded in a hologram, is avoided.

The object of the present invention is accomplished according to the invention by a composite pane as disclosed herein and a method as disclosed herein. Preferred embodiments are apparent from subclaims.

The invention relates to a composite pane comprising at least an outer pane having an outer surface and an inner surface, a first thermoplastic intermediate layer, a hologram element, and an inner pane having an outer surface and an inner surface.

According to the invention, the hologram element comprises a first set of holograms produced in one or more layers of a holographic material. The first set of holograms comprises a blue hologram, a green hologram, and a red hologram. The blue hologram can be activated by blue light having a wavelength in a first range and is not responsive to light of other wavelengths. The green hologram can be activated by green light having a wavelength in a second range and is not responsive to light of other wavelengths. The red hologram can be activated by red light having a wavelength in a third range and is not responsive to light of other wavelengths.

In particular, the term "hologram" refers to a reflection hologram that is arranged within a hologram element.

According to the invention, the composite pane also has a color-selective optical filter for selective absorption of light having a wavelength in the first range, of light having a wavelength in the second range, and of light having a wavelength in the third range.

In the composite pane according to the invention, the hologram element is arranged between the outer pane and the inner pane, the first thermoplastic layer is arranged between the outer pane and the hologram element or between the hologram element and the inner pane. In addition, according to the invention, the color-selective optical filter is arranged in front of the hologram element when viewed in through-vision from the outside through the composite pane.

The arrangement of the color-selective optical filter in front of the hologram element prevents unintentional activation of the blue, the green, and/or the red hologram by sunlight or artificial light shining on the composite pane from the outside.

In addition, compared to the protective hologram disclosed in EP 0 490 397 A2 that diffracts the ambient lighting, the arrangement of the color-selective optical filter in front of the hologram element when viewed in through-vision from the outside through the composite pane offers the advantage that passers-by cannot be dazzled by diffracted ambient lighting.

The outer pane and the inner pane have in each case, as described above, an exterior-side surface, i.e., an outer surface, and an interior-side surface, i.e., an inner surface, and a circumferential side edge extending therebetween. In the context of the invention, "outer surface" refers to the primary surface that is intended to face the external environment in the installed position. In the context of the invention, "inner surface" refers to the primary surface that is intended to face the interior in the installed position. The inner surface of the outer pane and the outer surface of the inner pane face each other in the composite pane according to the invention.

If the composite pane is intended, in a window opening of a vehicle or a building, to separate an interior from the external environment, the term "inner pane" refers, in the context of the invention, to the pane facing the interior (vehicle interior). "Outer pane" refers to the pane facing the external environment.

Preferably, the color-selective optical filter comprises color pigments or nanoparticles that selectively absorb blue light having a wavelength in the first range, green light having a wavelength in the second range, and red light having a wavelength in the third range. This means that the color-selective optical filter preferably includes three types of color pigments or nanoparticles. First, color pigments or nanoparticles that selectively absorb blue light having a wavelength in the first range, by means of which the blue hologram of the first set of holograms of the hologram element can be activated. Second, color pigments or nanoparticles that selectively absorb green light having a wavelength in the second range, by means of which the green hologram of the first set of holograms of the hologram element can be activated. Third, color pigments or nanoparticles that selectively absorb red light having a wavelength in the third range, by means of which the red hologram of the first set of holograms of the hologram element can be activated.

Color pigments suitable for the selective absorption of light in a specific wavelength range are described, for example, in EP 3 412 723 A1.

Nanoparticles that are suitable for selective absorption of light in a specific wavelength range are disclosed, for example, in WO 2019/008374 A1. The nanoparticles are, for example, so-called "quantum dots".

The person skilled in the art knows which color pigments or nanoparticles are suitable for selective absorption of light in a specific wavelength range.

The color-selective optical filter preferably extends over at least 50%, particularly preferably over at least 80%, most particularly preferably over at least 90% of the area of the composite pane. The color-selective optical filter can extend over the entire surface of the composite pane or substantially over the entire surface, i.e., full-surface minus a circumferential edge region of, for example, 20 mm, which is generally covered by a frame-like dark masking print. A full-surface or substantially full-surface arrangement of the color-selective filter offers advantages during manufacture. In addition, natural colors can thus be realized over the entire composite pane and color distortion due to color differences between regions in which a color-selective optical filter is arranged and regions in which it is not arranged can be largely reduced.

The hologram element comprises a holographic material and, optional, a first substrate layer and/or a second substrate layer. Suitable holographic materials are known to the person skilled in the art. Preferably, the hologram element comprises a photopolymer, dichromate gelatin, or silver halides as holographic material.

It goes without saying that the holographic material also preferably extends full-surface over the entire composite pane or substantially full-surface, i.e., full-surface minus a circumferential edge region of, for example, 20 mm, which is generally covered by a frame-like dark masking print.

The hologram element is preferably between 10 μm and 500 μm thick, particularly preferably between 10 μm and 100 μm thick.

In a particularly preferred embodiment of the composite pane according to the invention, the hologram element comprises dichromate gelatin or silver halides as holographic material, with the holographic material applied as a coating of the outer surface of the inner pane. In this embodiment, the first thermoplastic intermediate layer is arranged between the outer pane and the hologram element. Optionally, in this embodiment, the hologram element can include a second substrate layer, which is arranged in the composite pane between the first thermoplastic layer and the holographic material.

In another embodiment of the composite pane according to the invention, the composite pane additionally includes a second thermoplastic intermediate layer arranged between the outer pane and the inner pane, with the hologram element arranged between the first thermoplastic intermediate layer and the second thermoplastic intermediate layer. In this embodiment, the hologram element comprises a dichromate gelatin or silver halides as holographic material and a first substrate layer and is arranged in the composite pane such that the holographic material faces in the direction of the outer pane and the first substrate layer faces in the direction of the inner pane.

In another particularly preferred embodiment of the composite pane according to the invention, the composite pane additionally comprises a second thermoplastic intermediate layer arranged between the outer pane and the inner pane, with the hologram element arranged between the first thermoplastic intermediate layer and the second thermoplastic intermediate layer. In this embodiment, the hologram element comprises a holographic material and a second substrate layer arranged adjacent the first thermoplastic intermediate layer and a first substrate layer arranged adjacent the second thermoplastic intermediate layer, with the holographic material arranged between the first substrate layer and the second substrate layer. In this embodiment, the holographic material can be a dichromate gelatin, a silver halide, or a photopolymer.

In one embodiment, the first thermoplastic intermediate layer is arranged between the inner pane and the hologram element, and the hologram element comprises dichromate gelatin or silver halides as holographic material and a first substrate layer. In this embodiment, the holographic material is applied as a coating on the inner surface of the outer pane and the first substrate layer is arranged between the holographic material and the first thermoplastic intermediate layer.

In another embodiment, the first thermoplastic intermediate layer is arranged between the outer pane and the hologram element, and the hologram element comprises a holographic material in the form of a photopolymer and a second substrate layer, with the hologram element arranged in the composite pane such that the second substrate layer is arranged between the first thermoplastic intermediate layer and the holographic material. In this embodiment, the holographic material is bonded to the inner pane by means of an optical clear adhesive.

Suitable so-called optical clear adhesives (OCA) are known to the person skilled in the art. As an alternative to an optical clear adhesive, the outer surface of the inner pane can also be chemically pretreated and a primer can be used to achieve adhesion of the photopolymer to the inner pane.

The first substrate layer and the second substrate layer are, independently of one another, for example, 35 µm (microns) to 60 µm thick and contain, for example, polyamide (PA), cellulose triacetate (TAC), and/or polyethylene terephthalate (PET).

The photopolymer is, for example, 10 µm to 100 µm, for example, 16 µm, thick. Suitable photopolymers are known to the person skilled in the art.

In one embodiment, the color-selective optical filter is implemented as a coating on the outer surface of the outer pane. In another embodiment, the color-selective optical filter is implemented as a coating on the inner surface of the outer pane. Preferably, when the color-selective optical filter is implemented as a coating of the outer pane, this is implemented as a coating on the inner surface of the outer pane, since, in this way, the color-selective optical filter is protected against influences emanating from the external environment. When the color-selective optical filter is implemented as a coating on the outer surface of the outer pane, it can also optionally be provided with an additional protective layer for protection against external influences.

The color-selective optical filter can also be implemented as a coating on the first thermoplastic intermediate layer, provided the first thermoplastic intermediate layer is arranged between the outer pane and the hologram element. The coating can be implemented on the surface facing the outer pane or on the surface of the first thermoplastic intermediate layer facing the hologram element. As a result of the fact that, in these embodiments, the coating is arranged inside the composite pane, the color-selective optical filter is protected against influences of the external environment.

A color-selective optical filter implemented as a coating can, for example, have a layer thickness of 10 nm to 10 µm, preferably of 100 nm to 5.0 µm.

It goes without saying that the color-selective optical filter can also be formed from a plurality of coatings. For example, the color-selective optical filter can comprise three coatings. A coating that selectively absorbs blue light having a wavelength in the first range, a coating that selectively absorbs green light having a wavelength in the second range, and a coating that selectively absorbs red light having a wavelength in the third range. The individual coatings can also be applied to different layers of the composite pane.

The color-selective optical filter can also be implemented as color pigments or nanoparticles that are embedded in the first thermoplastic intermediate layer, provided the first thermoplastic intermediate layer is arranged between the outer pane and the hologram element.

Alternatively, it is also possible for the color-selective optical filter to be implemented as color pigments or nanoparticles that are embedded in the outer pane. In this embodiment, the color pigments or nanoparticles are embedded in the glass matrix of the outer pane.

If the composite pane as described above has a second substrate layer which is arranged in front of the holographic material when viewed in through-vision from the outside, the color-selective optical filter can also be implemented as color pigments or nanoparticles that are embedded in the second substrate layer.

It is possible, for example, to measure which wavelengths of light are selectively absorbed by the color-selective optical filter by positioning a spectrometer on the inner side of the composite pane and, with this, measuring the spectrum of the light on the inner side. The measured spectrum of light is reduced by the portions that are absorbed by the color-selective optical filter.

In one embodiment, the hologram element comprises a second set of holograms in addition to the first set of holograms produced in one or more layers of the holographic material. This second set of holograms includes a blue hologram that can be activated by blue light having a wavelength in the first range and is not responsive to light of other wavelengths; a green hologram that can be activated by green light having a wavelength in the second range and is not responsive to light of other wavelengths; and a red hologram that can be activated by red light having a wavelength in the third range and is not responsive to light of other wavelengths.

The blue hologram of the first set of holograms and the blue hologram of the second set of holograms can thus be activated by blue light having a wavelength in the same range. Likewise, the green hologram of the first set and the green hologram of the second set can thus be activated by green light having a wavelength in the same range. Also, the red hologram of the first set of holograms and the red hologram of the second set of holograms can thus be activated by red light having a wavelength in the same range. In this manner, by arranging the color-selective optical filter in front of the hologram element when viewed in through-vision from the outside, both an unintentional activation of the blue, of the green, and/or of the red hologram of the first set of holograms and an unintentional activation of the blue, of the green, and/or of the red hologram of the second set of holograms by sunlight or artificial light shining on the composite pane from the outside are prevented and only one color-selective optical filter is required for both sets of holograms for this purpose.

Preferably, the red hologram, the green hologram, and the blue hologram of the first set of holograms converge the light to one and the same focus.

In the embodiment of the composite pane according to the invention in which the hologram element comprises a first and a second set of holograms, the red hologram, the green hologram, and the blue hologram of the first set of holograms converge the light to one and the same first focus, and the red hologram, the green hologram, and the blue hologram of the second set of holograms converge the light to one and the same second focus.

Preferably, the second same focus is spatially separated from the first same focus. However, it is also possible for the first same focus and the second same focus to be one and the same.

For example, it is possible to display one image for the driver of a vehicle and one image for the passenger. Alternatively, two images for the driver or two images for the passenger can also be displayed.

Two sets of holograms whose virtual image widths differ can, for example, be used to display far and near HUD images for the driver.

The first region, the second region, and the third region are each, independently of one another, preferably at most 17 nm wide, particularly preferably at most 7 nm wide, most particularly preferably at most 3 nm wide. It goes without saying that the mentioned widths of the first region, the second region, and the third region refer both to the widths of the regions for activation of holograms in the hologram element and to the widths of the regions for the absorption properties of the color-selective optical filter. Such a narrow bandwidth for the absorption properties of the color-selective optical filter ensures that the total transmittance of the composite pane according to the invention is not influenced too much by the color-selective optical filter. Consequently, the color-selective optical filter and thus also the hologram element can be placed in the central field of view of the viewer, without the total transmittance through the composite pane being influenced too much.

Preferably, the total transmittance through the composite pane is reduced by the hologram element and the color-selective optical filter by at most 3%, particularly preferably by at most 2%.

In one embodiment, the first thermoplastic intermediate layer and the second thermoplastic intermediate layer contain, independently of one another, at least polyvinyl butyral (PVB), ethylene vinyl acetate (EVA), polyurethane (PU) or mixtures or copolymers or derivatives thereof, preferably polyvinyl butyral (PVB), particularly preferably polyvinyl butyral (PVB) and additives known to the person skilled in the art, such as plasticizers.

The first thermoplastic intermediate layer and the second thermoplastic intermediate layer can, independently of one another, be implemented by a single film or even by more than one film.

The first thermoplastic intermediate layer and/or the second thermoplastic intermediate layer can, independently of one another, also be a functional intermediate layer, in particular an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. For example, the first thermoplastic intermediate layer or the second thermoplastic intermediate layer can also be a band filter film.

The outer pane and the inner pane are preferably made of glass, particularly preferably of soda lime glass, as is customary for window panes. However, the panes can also be made of other types of glass, for example, quartz glass, borosilicate glass, or aluminosilicate glass, or of rigid clear plastics, for example, polycarbonate or polymethyl methacrylate. The panes can be clear or even tinted or colored. If the composite pane is used as a windshield, it should have sufficient light transmittance in the central field of view, preferably at least 70% in the primary viewing area A in accordance with ECE-R43.

The outer pane, the inner pane, the first thermoplastic intermediate layer, and/or the second thermoplastic intermediate layer can have suitable coatings known per se, for example, antireflection coatings, nonstick coatings, anti-scratch coatings, photocatalytic coatings, or solar protection coatings or low-E coatings. In the case of solar protection coatings, coatings that are as spectrally neutral as possible are preferred and/or they are preferably applied to the first thermoplastic intermediate layer or to the outer pane, in particular to the inner surface of the outer pane.

The thickness of the outer pane and the inner pane can vary widely and thus be adapted to the requirements in the individual case. The outer pane and the inner pane preferably have thicknesses of 0.5 mm to 5 mm, particularly preferably of 1 mm to 3 mm, most particularly preferably of 1.6 mm to 2.1 mm. For example, the outer pane has a thickness of 2.1 mm; and the inner pane, a thickness of 1.6 mm. However, the outer pane or in particular the inner pane can also be thin glass with a thickness of, for example, 0.55 mm.

The composite pane according to the invention can include one or more additional intermediate layers, in particular functional intermediate layers. An additional intermediate layer can, in particular, be an intermediate layer with acoustically damping properties, an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. If multiple additional intermediate layers are present, they can also have different functions.

It goes without saying that the color-selective optical filter can also be implemented as color pigments or nanoparticles that are embedded in an additional intermediate layer positioned in front of the hologram element when viewed in through-vision from the outside, or as a coating on such an additional intermediate layer.

It goes without saying that the color pigments or nanoparticles that can absorb blue light having a wavelength in the first range can also be embedded in a different layer than the color pigments or nanoparticles that absorb green light having a wavelength in the second range, and/or than the color pigments or nanoparticles that absorb red light having a wavelength in the third range. Likewise, the color pigments or nanoparticles that can absorb green light having a wavelength in the second range can also be embedded in a different layer than the color pigments or nanoparticles that absorb blue light having a wavelength in the first range, and/or than the color pigments or nanoparticles that absorb red light having a wavelength in the third range. Also, the color pigments or nanoparticles that can absorb red light having a wavelength in the third range can also be embedded in a different layer than the color pigments or nanoparticles that absorb blue light having a wavelength in the first range, and/or than the color pigments or nanoparticles that absorb green light having a wavelength in the second range.

The invention also includes a projection assembly for displaying information for a viewer, comprising at least a composite pane according to the invention and a projector aimed from the inside at the first set of holograms in the hologram element. The composite pane according to the invention can be implemented as described above in the various embodiments.

It goes without saying that if the composite pane according to the invention has a second set of holograms in addition to a first set of holograms, the projector is aimed from the inside at both the first set of holograms and at the second set of holograms. Alternatively, the projection assembly can also include two projectors, one aimed from the inside at the first set of holograms and one from the inside at the second set of holograms.

The projector emits light at wavelengths to which the holograms of the first set of holograms are responsive.

When there are two sets of holograms, the projector emits, or when there are two projectors, the projectors emit light at wavelengths to which both the holograms of the first set of holograms and the holograms of the second set of holograms are responsive.

Laser projectors are preferred because very discrete wavelengths can be achieved therewith.

The invention also relates to a method for producing a composite pane, wherein at least:
a) an outer pane having an outer surface and an inner surface, a first thermoplastic intermediate layer, an inner pane having an outer surface and an inner surface, and a color-selective optical filter for absorption of light having a wavelength in the first range, of light having a wavelength in the second range, and of light having a wavelength in the third range are provided,
b) a hologram element is provided, by producing, in one or more layers of a holographic material, a first set of holograms, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths,
c) a layer stack is formed in which the hologram element is arranged between the outer pane and the inner pane, the first thermoplastic layer is arranged between the outer pane and the hologram element or between the inner pane and the hologram element, and the color-selective optical filter is arranged in front of the hologram element when viewed in through-vision from the outside,
d) the layer stack is joined by lamination.

The invention thus also relates to a method for producing a composite pane, wherein at least:
a) an outer pane having an outer surface and an inner surface, a first thermoplastic intermediate layer, an inner pane having an outer surface and an inner surface, and a color-selective optical filter are provided,
b) a hologram element is provided by producing a first set of holograms in one or more layers of a holographic material, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths,
c) a layer stack is formed in which the hologram element is arranged between the outer pane and the inner pane, the first thermoplastic layer is arranged between the outer pane and the hologram element or between the inner pane and the hologram element, and the color-selective optical filter is arranged in front of the hologram element when viewed in through-vision from the outside,
d) the layer stack is joined by lamination, wherein the color-selective optical filter is a color-selective optical filter for absorption of light having a wavelength in the first range, of light having a wavelength in the second range, and of light having a wavelength in the third range.

The holographic material can, for example, be dichromate gelatin or silver halides or a photopolymer.

As explained in the individual embodiments of the composite pane according to the invention, the hologram element can, optionally, include a first substrate layer and/or a second substrate layer in addition to a holographic material.

When a dichromate gelatin or a silver halide is used as the holographic material, steps b) and c) can even be carried out simultaneously by applying the dichromate gelatin or the silver halide as a coating on the inner surface of the outer pane or preferably on the outer surface of the inner pane and then producing a first set of holograms in the holographic material.

The invention also relates to a method for producing a composite pane with a hologram element comprising a holographic material in the form of a photopolymer arranged between a first substrate layer and a second substrate layer, wherein at least:
a) an outer pane having an outer surface and an inner surface, a first thermoplastic intermediate layer, a second thermoplastic intermediate layer, an inner pane having an outer surface and an inner surface, and a color-selective optical filter for absorption of light having a wavelength in a first range, of light having a wavelength in a second range, and of light having a wavelength in a third range are provided,
b) a hologram element comprising a first substrate layer and a second substrate layer and a holographic material in the form of a photopolymer arranged therebetween is provided by producing a first set of holograms in one or more layers of the photopolymer arranged between the first substrate layer and the second substrate layer, wherein the first set of holograms comprises a blue hologram that can be activated by blue light having a wavelength in the first range and is not responsive to light of other wavelengths, a green hologram that can be activated by green light having a wavelength in the second range and is not responsive to light of other wavelengths, and a red hologram that can be activated by red light having a wavelength in the third range and is not responsive to light of other wavelengths.
c) a layer stack is formed, in which the hologram element is arranged between the outer pane and the inner pane, the first thermoplastic layer is arranged between the outer pane and the hologram element, the second thermoplastic layer is arranged between the hologram element and the inner pane, and the color-selective optical filter is arranged in front of the hologram element when viewed in through-vision from the outside,
d) the layer stack is joined by lamination.

Step a) and step b) can be carried out in any order.

The invention thus also relates to a method for producing a composite pane with a hologram element comprising a holographic material in the form of a photopolymer arranged between a first substrate layer and a second substrate layer, wherein at least:
a) an outer pane having an outer surface and an inner surface, a first thermoplastic intermediate layer, a second thermoplastic intermediate layer, an inner pane having an outer surface and an inner surface, and a color-selective optical filter are provided,
b) a hologram element comprising a first substrate layer and a second substrate layer and a holographic material in the form of a photopolymer arranged therebetween is provided by producing a first set of holograms in one or more layers of the photopolymer arranged between the first substrate layer and the second substrate layer, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths, c) a layer stack is formed in which the hologram element is arranged between the outer pane and the inner pane, the first thermoplastic layer is arranged between the outer pane and the hologram element, the second thermoplastic layer is arranged between the hologram element and the inner pane, and the color-selective optical filter is arranged in front of the hologram element when viewed in through-vision from the outside, d) the layer stack is joined by lamination, wherein the color-selective optical filter is a color-selective optical filter for absorption of light having a wavelength in the first range, of light having a wavelength in the second range, and of light having a wavelength in the third range.

Step a) and step b) can be carried out in any order.

The invention also relates to a method for producing a composite pane with a hologram element comprising a holographic material in the form of a photopolymer arranged between a first substrate layer and a second substrate layer, wherein at least:

a) an outer pane having an outer surface and an inner surface, a first thermoplastic intermediate layer, a first substrate layer, a holographic material in the form of a photopolymer, a second substrate layer, a second thermoplastic intermediate layer, and an inner pane having an outer surface and an inner surface are provided, b) a layer stack is formed in which the first substrate layer, the holographic material, and the second substrate layer are arranged between the outer pane and the inner pane, the first thermoplastic layer is arranged between the outer pane of the second substrate layer, the second thermoplastic layer is arranged between the first substrate layer and the inner pane, c) the layer stack is joined by lamination, d) a first set of holograms is produced in one or more layers of the holographic material, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths, e) a color-selective optical filter for absorption of light having a wavelength in the first range, of light having a wavelength in the second range, and of light having a wavelength in the third range is applied as a coating on the outer surface of the outer pane.

Preferably, the method includes, as yet another step, the sealing of the color-selective optical filter with a protective layer. Such a protective layer can, for example, prevent the color-selective optical filter from being damaged or worn by external influences, such as the windshield wiper blades.

During production of a first set of holograms in one or more layers of the holographic material in the form of a photopolymer by means of optical exposure, the one or more layers of the holographic material swell or shrink, as a result of which the wavelength ranges of the light by means of which the holograms can be activated shift in each case. The first region, the second region, and the third region thus differ in each case by a few nanometers from the range with which the writing process took place. If a color-selective optical filter is selected that absorbs light with wavelengths in the first range, in the second range, and in the third range, but not light in the ranges by means of which the first set of holograms was produced, this color-selective optical filter can be incorporated into the composite pane even already before the production of the first set of holograms in one or more layers of the holographic material in the form of a photopolymer.

The invention thus also relates to a method for producing a composite pane with a hologram element comprising a holographic material in the form of a photopolymer arranged between a first substrate layer and a second substrate layer, wherein at least:

a) an outer pane having an outer surface and an inner surface, a first thermoplastic intermediate layer, a color-selective optical filter for absorption of light having a wavelength in the first range, of light having a wavelength in the second range, and of light having a wavelength in the third range, a holographic material in the form of a photopolymer arranged between a first substrate layer and a second substrate layer, a second thermoplastic intermediate layer, and an inner pane having an outer surface and an inner surface are provided, b) a layer stack is formed in which the first substrate layer, the holographic material, and the second substrate layer are arranged between the outer pane and the inner pane, the first thermoplastic layer is arranged between the outer pane and that of the second substrate layer, the second thermoplastic layer is arranged between the first substrate layer and the inner pane, and the color-selective optical filter is arranged in front of the hologram material when viewed in through-vision from the outside, c) the layer stack is joined by lamination, d) a first set of holograms is produced in one or more layers of the holographic material, wherein the first set of holograms comprises a blue hologram that can be activated by blue light having a wavelength in the first range and is not responsive to light of other wavelengths, a green hologram that can be activated by green light having a wavelength in the second range and is not responsive to light of other wavelengths, and a red hologram that can be activated by red light having a wavelength in the third range and is not responsive to light of other wavelengths.

Here, blue light having a wavelength in a fourth range, green light having a wavelength in a fifth range, and red light having a wavelength in a sixth range are used for production of the first set of holograms. The fourth range differs from the first range by the value by which the wavelength necessary for activation of the blue hologram shifts due to the swelling or shrinking of the photopolymer due to the writing operation. The fifth range differs from the second range by the value by which the wavelength necessary for activation of the green hologram shifts due to the swelling or shrinking of the photopolymer due to the writing operation. The sixth region differs from the third region by the value by which the wavelength necessary for activation of the red hologram shifts due to the swelling or shrinking of the photopolymer due to the writing operation.

The invention, consequently, also relates to a method for producing a composite pane with a hologram element comprising a holographic material in the form of a photopolymer arranged between a first substrate layer and a second substrate layer, wherein at least:

a) an outer pane having an outer surface and an inner surface, a first thermoplastic intermediate layer, a color-selective optical filter, a holographic material in the form of a photopolymer arranged between a first substrate layer and a second substrate layer, a second thermoplastic intermediate layer, and an inner pane having an outer surface and an inner surface are provided, b) a layer stack is formed in which the first substrate layer, the holographic material and the second substrate layer are arranged between the outer pane and the inner pane, the first thermoplastic layer is arranged between the outer pane and that of the second substrate layer, the second thermoplastic layer between the first substrate layer and the inner pane, and the color-selective optical filter is arranged in front of the holographic material when viewed in through-vision from the outside, c) the layer stack is joined by lamination, d) a first set of holograms is produced in one or more layers of the holographic material, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths, wherein the color-selective optical filter is a color-selective optical filter for absorption of light having a wavelength in the first range, of light having a wavelength in the second range, and of light having a wavelength in the third range.

Here, blue light having a wavelength in a fourth range, green light having a wavelength in a fifth range, and red light having a wavelength in a sixth range are used for production of the first set of holograms. The fourth range differs from the first range by the value by which the wavelength necessary for activation of the blue hologram shifts due to the swelling or shrinking of the photopolymer due to the writing operation. The fifth range differs from the second range by the value by which the wavelength necessary for activation of the green hologram shifts due to the swelling or shrinking of the photopolymer due to the writing operation. The sixth region differs from the third region by the value by which the wavelength necessary for activation of the red hologram shifts due to the swelling or shrinking of the photopolymer due to the writing operation.

The swelling or shrinking of the photopolymer can thus be used specifically to write the hologram with a laser having one wavelength and, at a later time, to activate, i.e., read out, the hologram with another laser with a different wavelength, taking into account the swelling or shrinking of the photopolymer.

The invention also includes the use of a composite pane according to the invention with a color-selective optical filter as interior glazing or exterior glazing in a vehicle or a building, in particular as a vehicle pane in means of locomotion for travel on land, in the air, or on water, in particular in motor vehicles and in particular as a windshield that serves as a projection surface.

The invention is explained in detail with reference to drawings and exemplary embodiments.

Figure 2:
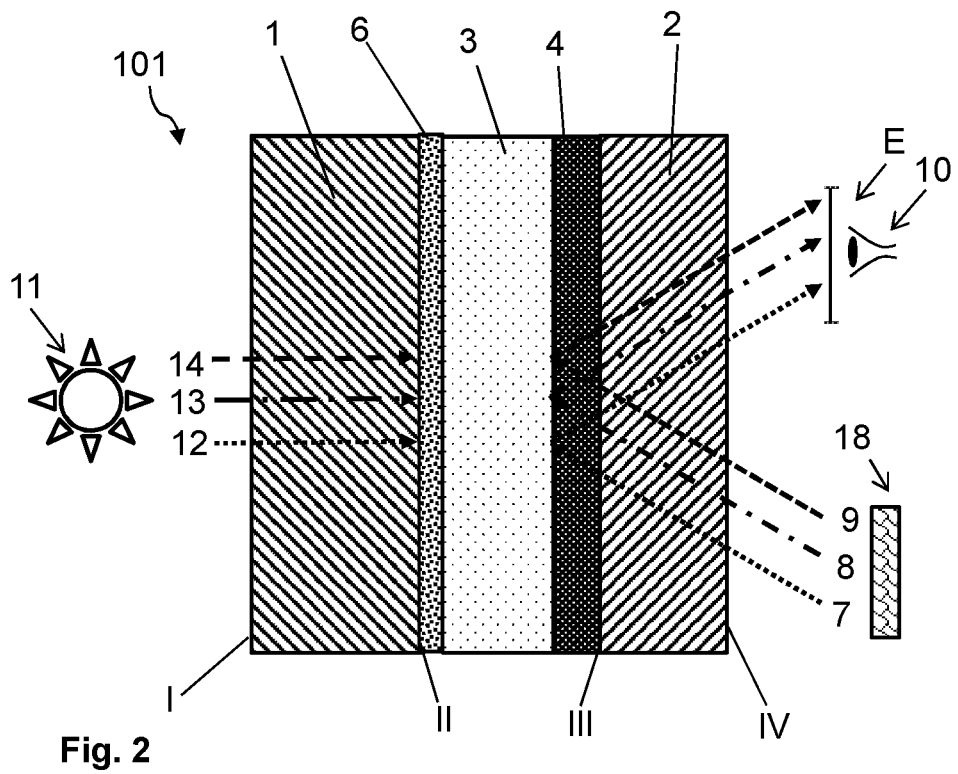
Figure 3:
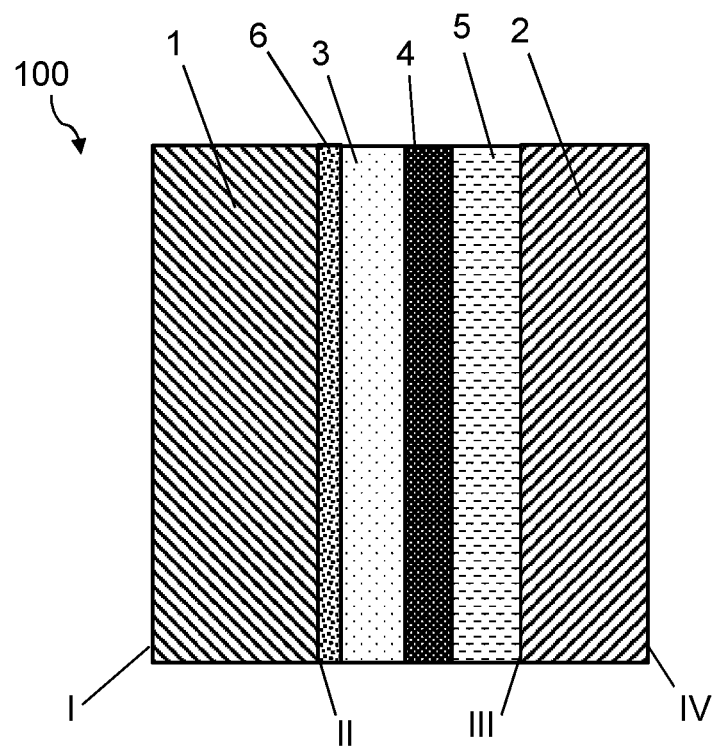
Figure 4:
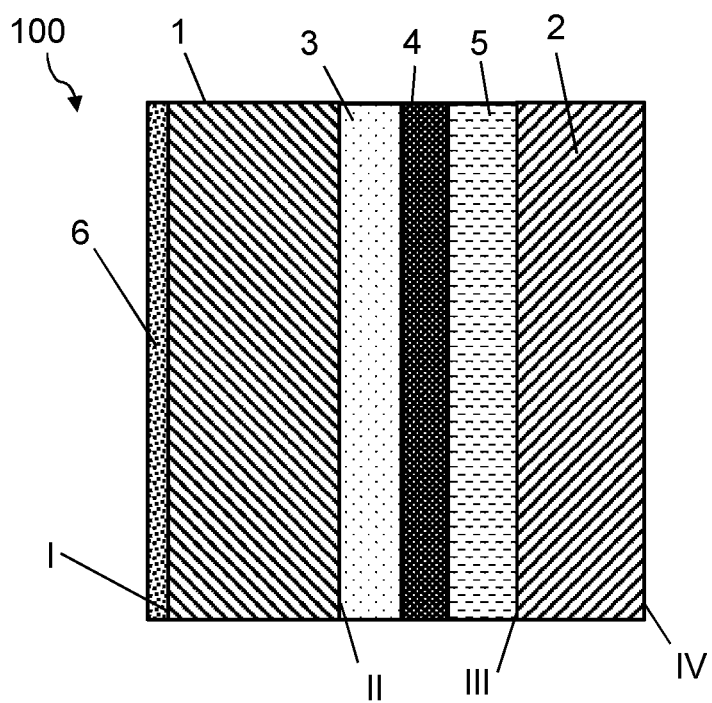
Figure 5:
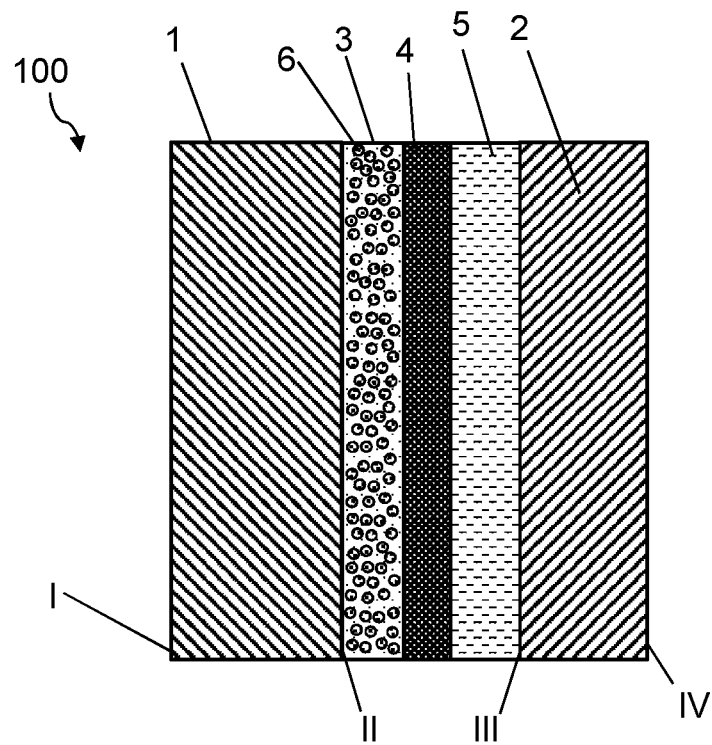
Figure 6:
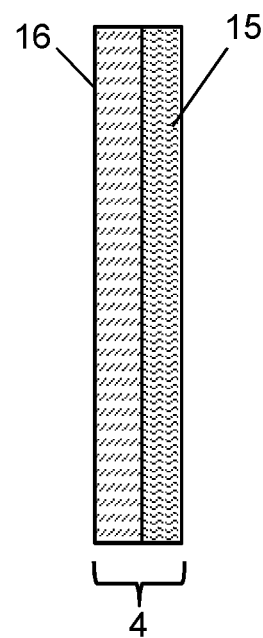
Figure 7:
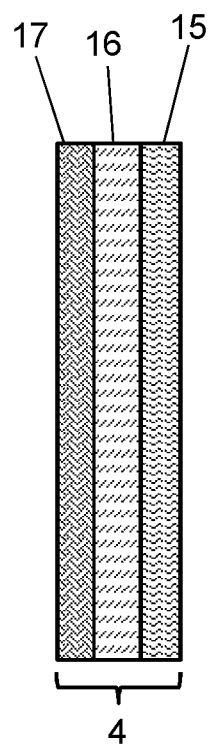
Figure 8:
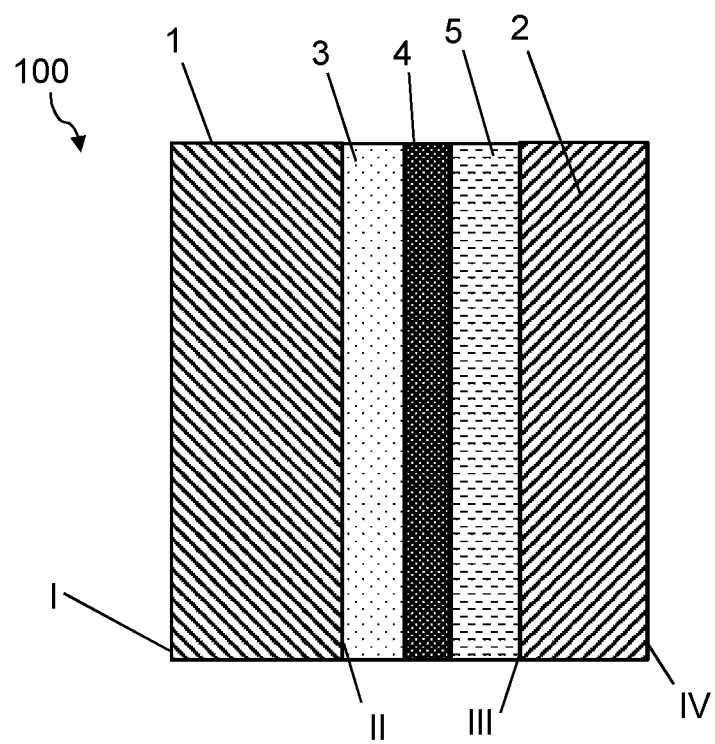
Figure 9:
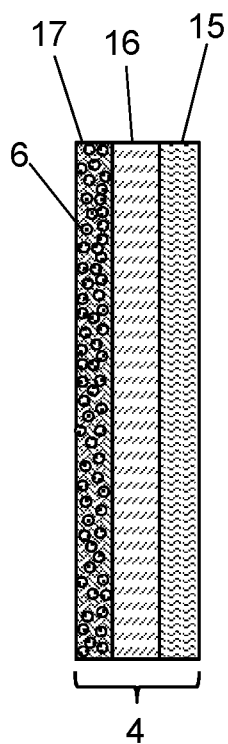
Figure 10:
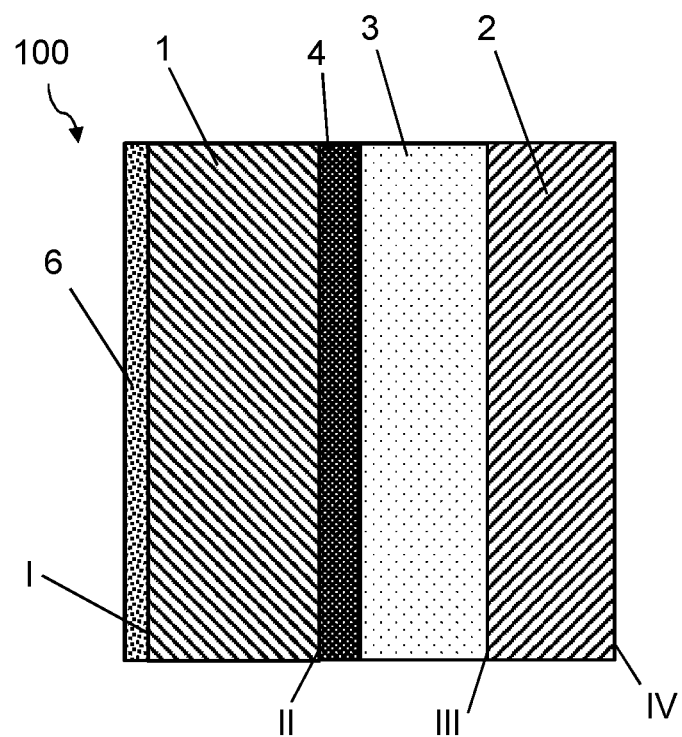
Figure 11:
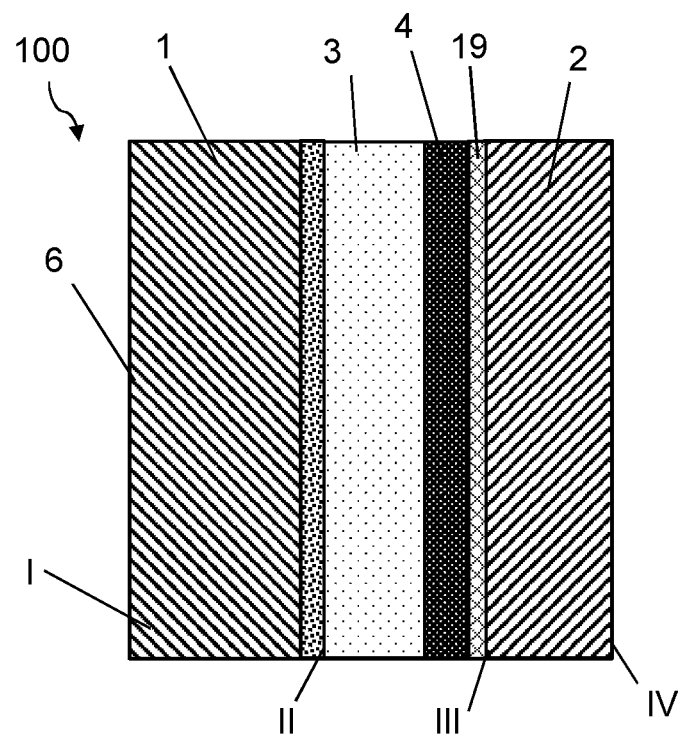
Figure 12:
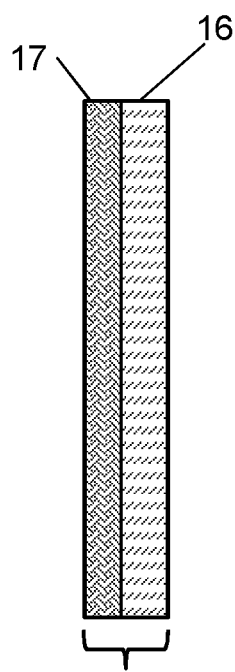
Figure 13:
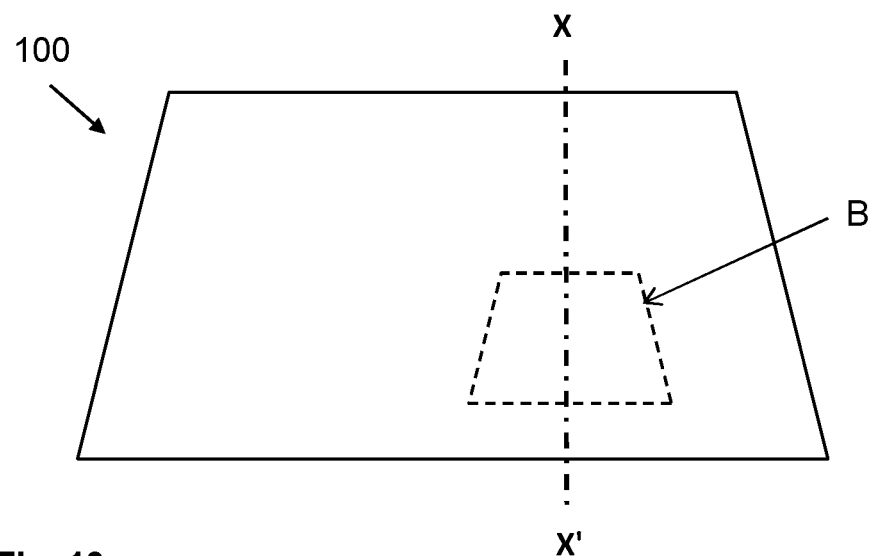
Figure 14:
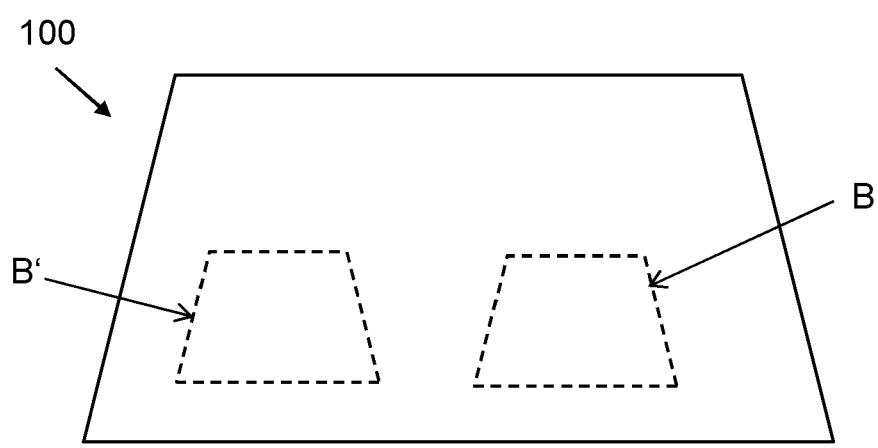
Figure 15:
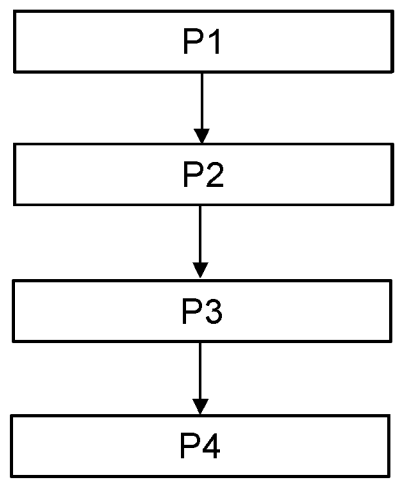
Figure 16:
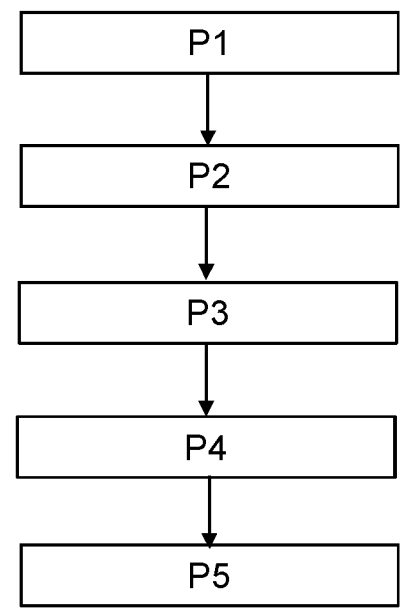
Figure 17:
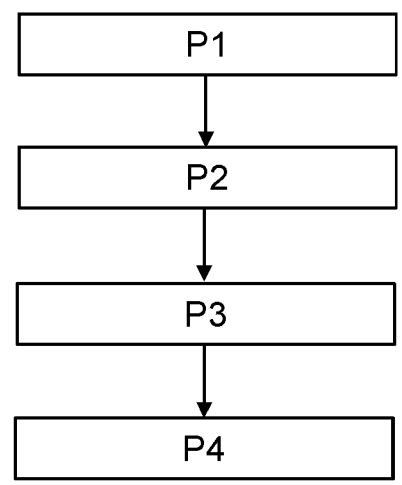

The drawings are schematic representations and are not to scale. The drawings in no way restrict the invention. They depict:

FIG. 1 a cross-section of an embodiment of a composite pane 100 according to the invention, FIG. 2 a cross-section of an embodiment of a projection assembly 101 according to the invention, FIG. 3 a cross-section through another embodiment of a composite pane 100 according to the invention, FIG. 4 a cross-section through another embodiment of a composite pane 100 according to the invention, FIG. 5 a cross-section through another embodiment of a composite pane 100 according to the invention, FIG. 6 a cross-section through an embodiment of a hologram element 4, FIG. 7 a cross-section through another embodiment of a hologram element 4, FIG. 8 a cross-section through another embodiment of a composite pane 100 according to the invention, FIG. 9 a cross-section through another embodiment of a hologram element 4, FIG. 10 a cross-section through another embodiment of a composite pane 100 according to the invention, FIG. 11 a cross-section through another embodiment of a composite pane 100 according to the invention, FIG. 12 a cross-section through another embodiment of a hologram element 4, FIG. 13 a plan view of an embodiment of a composite pane 100 according to the invention, FIG. 14 a plan view of another embodiment of a composite pane 100 according to the invention, FIG. 15 an exemplary embodiment of a method according to the invention using a flow chart, FIG. 16 another exemplary embodiment of a method according to the invention using a flow chart, and FIG. 17 another exemplary embodiment of a method according to the invention using a flow chart.

FIG. 1 depicts a cross-section of an embodiment of a composite pane 100 according to the invention. In the embodiment depicted in FIG. 1, the composite pane 100 has an outer pane 1 with an inner surface II and an outer surface I, a first thermoplastic intermediate layer 3, a hologram element 4 comprising a first set of holograms produced in one or more layers of a holographic material, a color-selective optical filter 6, and an inner pane 2 with an inner surface IV and an outer surface III. The first set of holograms comprises a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths. The color-selective optical filter can selectively absorb light having a wavelength in the first range, light having a wavelength in the second range, and light having a wavelength in the third range.

In the embodiment depicted in FIG. 1, the hologram element 4 is arranged between the outer pane 1 and the inner pane 2, the first thermoplastic layer 3 is arranged between the outer pane 1 and the hologram element 4, and the color-selective optical filter 6 is applied as a coating on the inner surface II of the outer pane 1. Due to the arrangement of the optical color-selective optical filter 6 as a coating on the inner surface II of the outer pane 1, it is arranged in front of the hologram element 4 when viewed in through-vision from the outside.

The outer pane is made, for example, of soda lime glass and is 2.1 mm thick. The inner pane 2 is made, for example, of soda lime glass and is 1.6 mm thick.

The first thermoplastic intermediate layer 3 is made, in the embodiment depicted in FIG. 1, for example, of polyvinyl butyral (PVB) and is 0.76 mm thick in each case.

The hologram element 4 is made, in the embodiment depicted in FIG. 1, for example, of a dichromate gelatin as a holographic material that is implemented as a coating on the outer surface III of the inner pane 2 and has a thickness of, for example, 100 µm. Alternatively, the outer surface III of the inner pane 2 can also be coated with a silver halide as a hologram element 4.

In the embodiment depicted in FIG. 1, the color-selective optical filter 6 is implemented as a coating of the inner surface II of the outer pane 1 having a first dye, a second dye, and a third dye, wherein the first dye selectively absorbs light having a wavelength in the first range, the second dye selectively absorbs light having a wavelength in the second range, and the third dye selectively absorbs light having a wavelength in the third range. The color-selective optical filter 6 implemented as a coating has, for example, a layer thickness of 1.0 µm. Alternatively, the color-selective optical filter can also be implemented as a coating of the first thermoplastic intermediate layer 3, as a coating on the outer surface I of the outer pane 1, or as nanoparticles embedded in the first thermoplastic intermediate layer 3.

FIG. 2 depicts a cross-section through an embodiment of a projection assembly 101 according to the invention. The projection assembly 101 comprises a composite pane 100 according to the embodiment depicted in FIG. 1 and a projector 18. The projector 18 is arranged internally. In FIG. 2, the beam path for blue light emanating from the projector 18 having a wavelength in a first range of, for example, 454 nm to 470 nm, the beam path for green light emanating from the projector 18 having a wavelength in a second range of, for example, 524 nm to 540 nm, and the beam path for red light emanating from the projector 18 having a wavelength in a third range of, for example, 610 nm to 626 nm are shown. The blue, green, and red light emanating from the projector 18 strikes the hologram element 4 and activates the blue hologram, the green hologram, and the red hologram of the hologram element 4. The blue light emitted by the projector 18 is reflected by the blue hologram, the green light emitted is reflected by the green hologram, and the red light emitted is reflected by the red hologram such that the holograms are perceived by a viewer 10 as virtual or real images on the side of the composite pane 100 facing away from him, when his eyes are situated within the so-called "eyebox E". The beam path for blue light having a wavelength in the first range emanating from a projector is provided with the reference character 7 in FIG. 2. The beam path for green light having a wavelength in the second range emanating from a projector is provided with the reference character 8 in FIG. 2. The beam path for red light having a wavelength in the third range emanating from a projector is provided with the reference character 9 in FIG. 2. Also shown in FIG. 2 is the beam path of an external radiation source for visible light 11, such as the sun. Blue light having a wavelength in the first range, green light having a wavelength in the second range, and red light having a wavelength in the third range emanating from the external radiation source for visible light 11 are absorbed by the color-selective optical filter 6 located in front of the hologram element 4 when viewed in through-vision from the outside. In this manner, unintentional activation of the blue hologram, of the green hologram, and of the red hologram of the hologram element 4 is prevented.

FIG. 3 depicts a cross-section of another embodiment of a composite pane 100 according to the invention. In the embodiment depicted in FIG. 3, the composite pane 100 has an outer pane 1 with an inner surface II and an outer surface I, a first thermoplastic intermediate layer 3, a hologram element 4 comprising a first set of holograms produced in one or more layers of a holographic material, a second thermoplastic intermediate layer 5, a color-selective optical filter 6, and an inner pane 2 with an inner surface IV and an outer surface III. The first set of holograms comprises a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths. The color-selective optical filter can selectively absorb light having a wavelength in the first range, light having a wavelength in the second range, and light having a wavelength in the third range.

In the embodiment depicted in FIG. 3, the hologram element 4 is arranged between the outer pane 1 and the inner pane 2, the first thermoplastic layer 3 is arranged between the outer pane 1 and the hologram element 4, the second thermoplastic layer 5 is arranged between the hologram element 4 and the inner pane 2, and the color-selective optical filter 6 is applied as a coating on the inner surface II of the outer pane 1. Due to the arrangement of the optical color-selective optical filter 6 as a coating on the inner surface II of the outer pane 1, it is arranged in front of the hologram element 4 when viewed in through-vision from the outside.

The embodiment depicted in FIG. 3 thus differs from that depicted in FIG. 1 in particular in that it has a second thermoplastic intermediate layer 5 and the hologram element 4 is arranged between the first thermoplastic intermediate layer 3 and the second thermoplastic intermediate layer 5.

The outer pane is made, for example, of soda lime glass and is 2.1 mm thick. The inner pane 2 is made, for example, of soda lime glass and is 1.6 mm thick.

In the embodiment depicted in FIG. 3, the first thermoplastic intermediate layer 3 and the second thermoplastic intermediate layer 5 are made, for example, of polyvinyl butyral (PVB) and are each 0.38 mm thick.

In the embodiment depicted in FIG. 3, the color-selective optical filter 6 is implemented as a coating of the inner surface II of the outer pane 1 having a first dye, a second dye, and a third dye, wherein the first dye selectively absorbs light having a wavelength in the first range, the second dye selectively absorbs light having a wavelength in the second range, and the third dye selectively absorbs light having a wavelength in the third range. The color-selective optical filter 6 implemented as a coating has, for example, a layer thickness of 1.0 µm. Alternatively, the color-selective optical filter 6 could also be implemented, for example, as nanoparticles embedded in the outer pane 1.

FIG. 4 depicts a cross-section through another embodiment of a composite pane 100 according to the invention. The embodiment depicted in cross-section in FIG. 4 differs from that depicted in FIG. 3 only in that the color-selective optical filter 6 is implemented as a coating on the outer surface I of the outer pane 1. To protect the color-selective optical filter 6 against external influences, it is preferably provided with a protective layer in the embodiment depicted in FIG. 4 (not shown in FIG. 4).

FIG. 5 depicts a cross-section through another embodiment of a composite pane 100 according to the invention. The embodiment depicted in cross-section in FIG. 5 differs from that depicted in FIG. 3 in that the color-selective optical filter 6 is implemented as nanoparticles embedded in the first thermoplastic intermediate layer 3. The first set of holograms in the hologram element 4 comprises, for example, a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths. The nanoparticles embedded in the first thermoplastic intermediate layer 3 are, for example, so-called "quantum dots". Embedded in the first thermoplastic intermediate layer are quantum dots that selectively absorb light having a wavelength in the first range, quantum dots that selectively light absorb having a wavelength in the second range, and quantum dots that selectively absorb light having a wavelength in the third range. Alternatively, the nanoparticles can also be embedded in the glass matrix of the outer pane instead of in the first thermoplastic intermediate layer 3.

FIG. 6 depicts a cross-section through an embodiment of a hologram element 4 that can have the composite pane 100 depicted in various embodiments in FIG. 3 through 5.

In the embodiment of a hologram element 4 depicted in FIG. 6, the hologram element 4 comprises a first substrate layer 15 and a holographic material 16. In the composite pane 100 of FIG. 3 through 5, the hologram element 4 depicted in FIG. 6 is arranged such that the first substrate layer 15 is arranged adjacent the second thermoplastic intermediate layer 5 and the holographic material 16 is arranged adjacent the first thermoplastic intermediate layer 3.

The holographic material 16 can be, for example, a dichromate gelatin or a silver halide with a thickness of 50 μm or 100 μm. The first substrate layer 15 is made, for example, of polyethylene terephthalate (PET) and has a thickness of 35 μm. The holographic material 16 is applied as a coating on the first substrate layer 15.

A first set of holograms is produced in the holographic material 16 of the hologram element 4. The first set of holograms comprises a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths.

FIG. 7 depicts a cross-section through another embodiment of a hologram element 4 that can have the composite pane 100 depicted in various embodiments in FIG. 3 through 5.

In the embodiment depicted in FIG. 7 of a hologram element 4, the hologram element 4 comprises a first substrate layer 15, a second substrate layer 17, and a holographic material 16, wherein the holographic material 16 is arranged between the first substrate layer 15 and the second substrate layer 17.

The first substrate layer 15 and the second substrate layer 16 have, for example, in each case a thickness of 35 μm. The holographic material 16 can be, for example, a dichromate gelatin or a silver halide with a thickness of 50 μm or 100 μm or a photopolymer with a thickness of, for example, 16 μm. The first substrate layer 15 and the second substrate layer 17 are made, for example, of polyethylene terephthalate (PET).

A first set of holograms is produced in the holographic material 16 of the hologram element 4. The first set of holograms comprises a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths.

FIG. 8 depicts a cross-section through another embodiment of a composite pane 100 according to the invention, and FIG. 9 depicts a cross-section through the hologram element 4 that has the composite pane 100 depicted in FIG. 8.

The embodiment depicted in FIG. 8 in combination with FIG. 9 differs from the embodiment depicted in FIG. 3 in that the hologram element 4 has a first substrate layer 15 with a thickness of 35 μm, a second substrate layer 17 with a thickness of 35 μm, and a photopolymer film 16 arranged therebetween with a thickness of 16 μm. The first substrate layer 15 is arranged adjacent the second thermoplastic intermediate layer 5 and the second substrate layer 17 is arranged adjacent the first thermoplastic intermediate layer 3. A first set of holograms is produced in the photopolymer film 16. The first set of holograms comprises a blue hologram that can be activated by blue light having a wavelength in a first range of, for example, 454 nm to 470 nm and is not responsive to light of other wavelengths, a green hologram that can be activated by green light having a wavelength in a second range of, for example, 524 nm to 540 nm and is not responsive to light of other wavelengths, and a red hologram that can be activated by red light having a wavelength in a third range of, for example, 610 nm to 626 nm and is not responsive to light of other wavelengths.

The first substrate layer 15 and the second substrate layer 17 are made, for example, of polyethylene terephthalate (PET). In addition, in the embodiment depicted in FIG. 8, in which the hologram element 4 is constructed as in FIG. 9, the color-selective optical filter is implemented as nanoparticles embedded in the second substrate layer 17. Embedded in the second substrate layer 17 are nanoparticles that selectively absorb light having a wavelength in the first range, nanoparticles that selectively absorb light having a wavelength in the second range, and nanoparticles that selectively absorb light having a wavelength in the third range.

FIG. 10 depicts a cross-section through another embodiment of a composite pane 100 according to the invention. This differs from that depicted in FIG. 1 only in that the hologram element 4 is arranged between the outer pane 1 and the first thermoplastic intermediate layer 3 and, as depicted in FIG. 6, comprises a holographic material 16 and a first substrate layer 15. In the embodiment depicted in FIG. 10, the holographic material 16 is a dichromate gelatin or a silver halide and is implemented as, for example, a 100 μm coating of the inner surface II of the outer pane 1. The first substrate layer 15 is arranged between the holographic material 16 and the first thermoplastic intermediate layer 3. In addition, the color-selective optical filter 6 is implemented as a coating on the outer surface I of the outer pane 1. To protect the color-selective optical filter 6 against external influences, it is preferably provided with a protective layer in the embodiment depicted in FIG. 10 (not shown in FIG. 10). Alternatively, the color-selective optical filter 6 could also be implemented, for example, as nanoparticles embedded in the outer pane 1. The first substrate layer 15 is made, for example, of polyethylene terephthalate (PET) and has a thickness of 35 μm.

FIG. 11 depicts a cross-section through another embodiment of a composite pane 100 according to the invention. The embodiment depicted in FIG. 11 differs from the embodiment depicted in FIG. 1 only in that the hologram element 4, as depicted in FIG. 12, comprises a holographic material 4 and a second substrate layer 17 and is bonded to the outer surface III of the inner pane 2 by means of an optical clear adhesive 19, wherein the holographic material 4 is arranged adjacent the optical clear adhesive 19 and the second substrate layer 17 is arranged adjacent the first thermoplastic layer 3. The holographic material 16 in the embodiment depicted in FIGS. 11 and 12 is a photopolymer with a thickness of 16 μm. The second substrate layer 17 is, for example, a PET layer with a thickness of 100 μm.

FIG. 13 depicts a plan view of an embodiment of a composite pane 100 according to the invention. The region in which a first set of holograms is arranged is identified with the reference character B in FIG. 7. FIG. 1 through 5, 8, 10, and 11 depict cross-sections of various embodiments along the section line X-X'. The region B is, for example, the HUD region of a composite pane 100 according to the invention implemented as a windshield.

FIG. 14 depicts a plan view of an embodiment of a composite pane 100 according to the invention. The embodiment depicted in plan view in FIG. 8 differs from that depicted in plan view in FIG. 13 in that in addition to the region B, in which the first set of holograms is arranged, the composite pane 100 has a region in which a second that of holograms is arranged and which is identified in FIG. 14 with the reference character B'.

FIG. 15 depicts an exemplary embodiment of the method according to the invention for producing a composite pane 100 according to the invention based on a flow chart comprising the steps:

P1 Providing an outer pane 1 having an outer surface I and an inner surface II, a first thermoplastic intermediate layer 3, an inner pane 2 having an outer surface III and an inner surface IV, and a color-selective optical filter 6 for absorption of light having a wavelength in the first range, of light having a wavelength in the second range, and of light having a wavelength in the third range.

P2 Providing a hologram element 4, by producing a first set of holograms in one or more layers of a holographic material, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths.

P3 Forming a layer stack in which the hologram element 4 is arranged between the outer pane 1 and the inner pane 2, the first thermoplastic layer 3 is arranged between the outer pane 1 and the hologram element 4 or between the hologram element 4 and the inner pane 2, and the color-selective optical filter is arranged in front of the hologram element 4 when viewed in through-vision from the outside.

P4 Joining the layer stack by lamination.

FIG. 16 depicts an exemplary embodiment of a method according to the invention for producing a composite pane 100 according to the invention with a photopolymer as a holographic material 16 based on a flow chart comprising the steps:

P1 Providing an outer pane 1 having an outer surface I and an inner surface II, a first thermoplastic intermediate layer 3, a holographic material 16 in the form of a photopolymer arranged between a first substrate layer 15 and a second substrate layer 17, a second thermoplastic intermediate layer 5 and an inner pane 2 having an outer surface III and an inner surface IV.

P2 Forming a layer stack in which the first substrate layer 15, the holographic material 16, and the second substrate layer 17 are arranged between the outer pane 1 and the inner pane 2, the first thermoplastic layer 3 is arranged between the outer pane 1 and the second substrate layer 17, the second thermoplastic layer 5 is arranged between the first substrate layer 15 and the inner pane 2.

P3 Joining the layer stack by lamination.

P4 Producing a first set of holograms in one or more layers of the holographic material 16, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths.

P5 Applying the color-selective optical filter 6 for absorption of light having a wavelength in the first range, of light having a wavelength in the second range, and of light having a wavelength in the third range as a coating on the outer surface I of the outer pane 1.

Preferably, the method can include, as yet another step, the sealing of the color-selective optical filter 6 with a protective layer. Such a protective layer can, for example, prevent the color-selective optical filter from being damaged or worn by external influences, such as the windshield wiper blades.

FIG. 17 depicts an exemplary embodiment of a method according to the invention for producing a composite pane 100 according to the invention with a photopolymer as a holographic material 16 based on a flow chart comprising the steps:

P1 Providing an outer pane 1 having an outer surface I and an inner surface II, a first thermoplastic intermediate layer 3, a color-selective optical filter 6 for absorption of light having a wavelength in the first range, of light having a wavelength in the second range, and of light having a wavelength in the third range, a holographic material 16 in the form of a photopolymer arranged between a first substrate layer 15 and a second substrate layer 17, a second thermoplastic intermediate layer 5, and an inner pane 2 having an outer surface III and an inner surface IV.

P2 Forming a layer stack in which the first substrate layer 15, the holographic material 16, and the second substrate layer 17 are arranged between the outer pane 1 and the inner pane 2, the first thermoplastic layer 3 is arranged between the outer pane 1 and the second substrate layer 17, the second thermoplastic layer 5 is arranged between the first substrate layer 15 and the inner pane 2, and the color-selective optical filter is arranged in front of the holographic material 16 when viewed in through-vision from the outside.

P3 Joining the layer stack by lamination.

P4 Producing a first set of holograms in one or more layers of the holographic material 16, wherein the first set of holograms comprises a blue hologram that can be activated by blue light having a wavelength in a first range and is not responsive to light of other wavelengths, a green hologram that can be activated by green light having a wavelength in a second range and is not responsive to light of other wavelengths, and a red hologram that can be activated by red light having a wavelength in a third range and is not responsive to light of other wavelengths.

In the method depicted in FIG. 17, during production of the hologram element in step P4, wavelengths other than those filtered out by the color-selective filter are used in the exposure for recording the hologram. Wavelengths are used that take into account the shrinking/swelling of the holographic material during lamination and the shift in wavelengths associated therewith.

LIST OF REFERENCE CHARACTERS 1 outer pane
2 inner pane
3 first thermoplastic intermediate layer
4 hologram element
5 second thermoplastic intermediate layer
6 color-selective optical filter
7 beam path for blue light having a wavelength in a first range emanating from a projector
8 beam path for green light having a wavelength in a second range emanating from a projector
9 beam path for red light having a wavelength in a third range emanating from a projector
10 vehicle driver/viewer
11 radiation source for visible light
12 beam path for electromagnetic waves having a wavelength in the first range emanating from a radiation source for visible light
13 beam path for electromagnetic waves having a wavelength in the second range emanating from a radiation source for visible light
14 beam path for electromagnetic waves having a wavelength in the third range emanating from a radiation source for visible light
15 first substrate layer
16 holographic material
17 second substrate layer
18 projector
19 optical clear adhesive
100 composite pane
101 projection assembly
I outer surface of the outer pane 1
II inner surface of the outer pane 1
III outer surface of the inner pane 2
IV inner surface of the inner pane 2
B region of the first set of holograms
B' region of the second set of holograms
E eyebox
X-X' section line

The invention claimed is:

1. A composite pane, comprising:
   an outer pane having an outer surface and an inner surface,
   a first thermoplastic intermediate layer,
   a hologram element comprising a first set of holograms produced in one or more layers of a holographic material, wherein the first set of holograms comprises a blue hologram that is activatable by blue light having a wavelength in a first range and is not responsive to light of other wavelengths, a green hologram that is activatable by green light having a wavelength in a second range and is not responsive to light of other wavelengths, and a red hologram that is activatable by red light having a wavelength in a third range and is not responsive to light of other wavelengths,
   an inner pane having an outer surface and an inner surface, and
   a color-selective optical filter for selective absorption of light having a wavelength in the first range, of light having a wavelength in the second range, and of light having a wavelength in the third range,
   wherein the hologram element is arranged between the outer pane and the inner pane, the first thermoplastic layer is arranged between the outer pane and the hologram element or between the inner pane and the hologram element, and the entire color-selective optical filter is arranged in front of the hologram element when viewed in through-vision from the outside.

2. The composite pane according to claim 1, wherein the color-selective optical filter comprises color pigments or nanoparticles for selective absorption of the blue light having a wavelength in the first range, of the green light having a wavelength in the second range, and of the red light having a wavelength in the third range.

3. The composite pane according to claim 1, wherein the color-selective optical filter extends over at least 50% of an area of the composite pane.

4. The composite pane according to claim 3, wherein the color-selective optical filter extends over at least 80% of the area of the composite pane.

5. The composite pane according to claim 4, wherein the color-selective optical filter extends over at least 90% of the area of the composite pane.

6. The composite pane according to claim 1, wherein the hologram element comprises a photopolymer, dichromate gelatin, or silver halides as a holographic material.

7. The composite pane according to claim 6, wherein the hologram element comprises dichromate gelatin or silver halides as a holographic material and is implemented as a coating of the outer surface of the inner pane (2), and wherein the first thermoplastic intermediate layer is arranged between the outer pane and the hologram element.

8. The composite pane according to claim 6, additionally comprising a second thermoplastic intermediate layer arranged between the outer pane and the inner pane, wherein the hologram element is arranged between the first thermoplastic intermediate layer and the second thermoplastic intermediate layer, wherein the hologram element comprises holographic material in the form of dichromate gelatin or silver halides and a first substrate layer, and wherein the hologram element is arranged in the composite pane such that the holographic material faces in a direction of the outer pane and the first substrate layer faces in a direction of the inner pane.

9. The composite pane according to claim 6, wherein the first thermoplastic intermediate layer is arranged between the inner pane and the hologram element, wherein the hologram element comprises holographic material in the form of dichromate gelatin or silver halides and a first substrate layer, wherein the holographic material is applied as a coating on the inner surface of the outer pane, and wherein the first substrate layer is arranged between the holographic material and the first thermoplastic intermediate layer.

10. The composite pane according to claim 6, wherein the first thermoplastic intermediate layer is arranged between the outer pane and the hologram element, wherein the hologram element comprises holographic material in the form of a photopolymer and a second substrate layer, wherein the second substrate layer is arranged between the first thermoplastic intermediate layer and the holographic material, and wherein the holographic material is bonded to the outer surface of the inner pane by means of an optical clear adhesive.

11. The composite pane according to claim 1, additionally comprising a second thermoplastic intermediate layer arranged between the outer pane and the inner pane, wherein the first thermoplastic intermediate layer is arranged between the outer pane and the hologram element, the second thermoplastic intermediate layer is arranged between the inner pane and the hologram element, wherein the hologram element is arranged between the first thermoplastic intermediate layer and the second thermoplastic intermediate layer, wherein the hologram element comprises the holographic material and a second substrate layer arranged adjacent the first thermoplastic intermediate layer and a first substrate layer arranged adjacent the second thermoplastic intermediate layer, and wherein the holographic material is arranged between the first substrate layer and the second substrate layer.

12. The composite pane according to claim 11, wherein the color-selective optical filter is implemented as a coating on the second substrate layer or as color pigments or nanoparticles that are embedded in the second substrate layer.

13. The composite pane according to claim 1, wherein the color-selective optical filter is implemented as a coating on the outer surface or the inner surface of the outer pane or as a coating on one of the layers arranged between the outer pane and the hologram element or as color pigments or nanoparticles that are embedded in the outer pane or in one of the layers arranged between the outer pane and the hologram element.

14. The composite pane according to claim 1, wherein the hologram element additionally comprises a second set of holograms produced in one or more layers of the holographic material, and the second set of holograms comprises a blue hologram that is activatable by blue light having a wavelength in the first range and is not responsive to light of other wavelengths, a green hologram that is activatable by green light having a wavelength in the second range and is not responsive to light of other wavelengths, and a red hologram that is activatable by red light having a wavelength in the third range and is not responsive to light of other wavelengths.

15. The composite pane according to claim 1, wherein the first range, the second range, and the third range are in each case, independently of one another, at most 17 nm wide.

16. The composite pane according to claim 15, wherein the first range, the second range, and the third range are in each case, independently of one another, at most 3 nm wide.

17. A method for producing a composite pane according to claim 1, comprising:
   a) providing an outer pane having an outer surface and an inner surface, a first thermoplastic intermediate layer, an inner pane having an outer surface and an inner surface, and a color-selective optical filter for absorption of light having a wavelength in the first range, of light having a wavelength in the second range, and of light having a wavelength in the third range,
   b) providing a hologram element by producing, in one or more layers of a holographic material, a first set of holograms, wherein the first set of holograms comprises a blue hologram that is activatable by blue light having a wavelength in a first range and is not responsive to light of other wavelengths, a green hologram that is activatable by green light having a wavelength in a second range and is not responsive to light of other wavelengths, and a red hologram that is activatable by red light having a wavelength in a third range and is not responsive to light of other wavelengths,
   c) forming a layer stack, in which the hologram element is arranged between the outer pane and the inner pane, the first thermoplastic layer is arranged between the outer pane and the hologram element or between the inner pane and the hologram element, and the color-selective optical filter is arranged in front of the hologram element when viewed in through-vision from the outside, and
   d) joining the layer stack by lamination.

18. A method comprising providing a composite pane according to claim 1 as interior glazing or exterior glazing in a vehicle or a building.

19. The method according to claim 18, wherein the composite pane is a vehicle pane in a vehicle of locomotion for travel on land, in the air, or on water.

20. The method according to claim 19, wherein the vehicle pane is a windshield that serves as a projection surface.

* * * * *